Nov. 12, 1963   W. R. EULITZ   3,110,318
SLOSH SUPPRESSING DEVICE AND METHOD
Filed Aug. 10, 1962   3 Sheets-Sheet 1
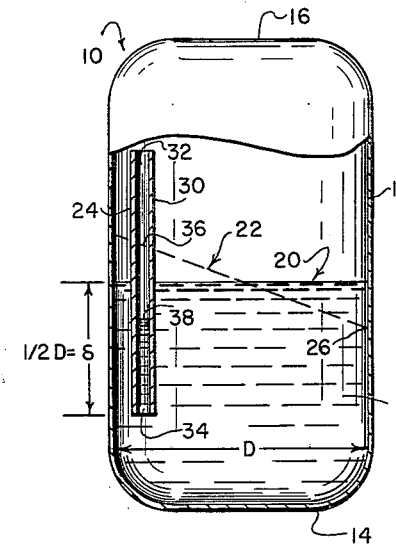
FIG. 1
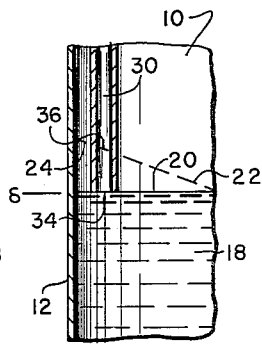
FIG. 2
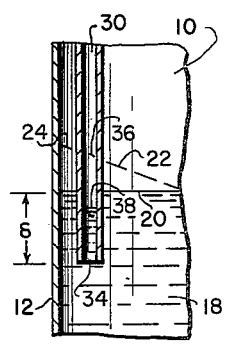
FIG. 3
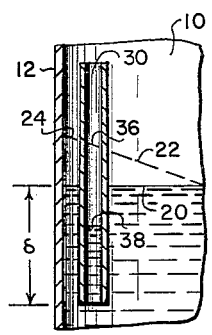
FIG. 4
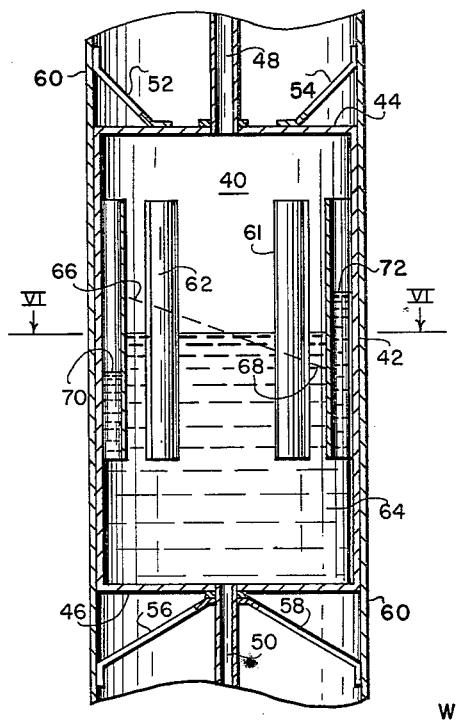
FIG. 5
FIG. 6
WERNER R. EULITZ
INVENTOR.
BY
ATTORNEYS Nov. 12, 1963 W. R. EULITZ 3,110,318
SLOSH SUPPRESSING DEVICE AND METHOD
Filed Aug. 10, 1962 3 Sheets-Sheet 2

WERNER R. EULITZ
*INVENTOR.*

BY
ATTORNEYS

Nov. 12, 1963  W. R. EULITZ  3,110,318
SLOSH SUPPRESSING DEVICE AND METHOD
Filed Aug. 10, 1962  3 Sheets-Sheet 3

WERNER R. EULITZ
INVENTOR.

BY

ATTORNEYS

United States Patent Office 3,110,318
Patented Nov. 12, 1963

3,110,318
SLOSH SUPPRESSING DEVICE AND METHOD
Werner R. Eulitz, Huntsville, Ala., assignor to the United States of America as represented by the administrator of the National Aeronautics and Space Administration
Filed Aug. 10, 1962, Ser. No. 216,710
22 Claims. (Cl. 137—1)
(Granted under Title 35, U.S. Code (1952), sec. 266)

The invention described herein may be manufactured and used by or for the Government of the United States of America for governmental purposes without the payment of any royalties thereon or therefor.

This invention relates in general to methods and means of preventing slosh in a container.

More specifically, it incorporates a method of and means for slosh suppression for use in liquid propellant vehicle propellant containers.

Launch or rocket vehicle propellant containers are affected by various mechanical vibrations and control oscillations which excite resonance oscillations of the contained liquid prepellants with amplitudes which, in general, increase with tank diameter. Such liquid oscillations are known as "sloshing." The constantly increasing size of space vehicles introduces more and more problem areas in modern space technology, since the increased length of vehicles lowers the fundamental bending frequencies, and in addition, larger propellant tanks lower propellant oscillation frequencies. Thus it is readily seen that propellant oscillation in tanks becomes more and more critical with longer tanks and with larger tank diameters. In particular, it has been found that with many of the larger vehicles propellant sloshing has been a major cause of failure in that the propellant oscillations approached the control frequencies and saturated the control systems, thus causing mission failure.

Liquid in a partially filled container has a strong tendency to slosh even under the slightest disturbances. That the influence of a sloshing propellant upon vehicle stability is an acute problem is readily apparent when it is realized that more than 90% of the total weight of a liquid propellant rocket vehicle at launch is represented by liquid propellant. When the natural frequencies of the propellant in the tanks is close to the control frequencies, or to the lower modes of elastic vibrations of the vehicle, such as the fundamental body bending mode, or to the natural frequency of a control sensor, then obviously the problem becomes extremely acute. Thus, it is apparent that the utilization of slosh damping devices is inevitable and mandatory for optimum future launch vehicle projects.

The first practical attempts to suppress slosh motion were necessarily made with the development of the larger rocket missiles. These were essentially of two basic types. The simplest type acted to break the "surf" toward the container walls by means of sheet metal baffles fixed in a number of layers circumferentially around the container wall, while the second employed the use of "egg crate" like baffles which divided the tank volume axially in many small sections. This increased the natural frequency of each section far beyond any forseeable external frequency, while decreasing the amplitude due to the small surface area of each section. Although this last described device suppressed sloshing satisfactorily, because of the very large weight penalty to the missile, and because it is probable such disturbances caused considerable pressure decay in the missile system, the egg crate baffle has not found continuing practical application. In pursuance of the basic baffle type anti-slosh devices, many variations of wall-fixed baffle devices have been employed. All are based upon the same principle; i.e., breaking the wave amplitude at the tank wall and thus enhancing the turbulence of the liquid surface. Because of the excessive weight of such baffle devices, it is necessary to arrange them in a step-wise manner in order to hold weight to a feasible figure. This consequently makes the efficiency or operativeness of such fixed baffles periodical rather than continuous. Also, due to the fact that a liquid in motion within a container is affected only in the proportion of the liquid corresponding to about ¼ of the tank diameter at any given depth, a large part of any such baffle devices are always inoperative. This naturally minimizes the effectiveness-to-weight ratio considerably, as well as enhancing or speeding up pressure decay within the container which entails a major disadvantage in launch vehicles.

A third approach which has been employed for utilization on the larger missiles has been a discontinuous "can" type floating device which device rose and fell with the liquid surface. The "cans" were constructed of perforated, essentially cylindrical bodies and a plurality thereof were then placed in the container so as to float on the propellant. The cans had a length generally of ¼ of the tank diameter. These cans were found to perform very well in damping sloshing, were of minimum weight, and were effective to prevent propellant pressure decay. However, they had a major disadvantage because of their free mobility within the tank in that they were subject to impact with the container particularly during transportation of the vehicle. Thus, although superior to the fixed baffle designs, they were still subject to the limitation imposed by transportation requirements.

The present invention overcomes all of the above noted deficiencies in a highly practical economical and simple manner, while giving excellent slosh suppression and obviating pressure decay. In essence, the invention is predicated upon an observed phenomenon which may best be termed "wave interference." When an open tube is inserted or immersed in an oscillating liquid near a tank wall and in the plane of motion of the liquid oscillation, the liquid level inside the tube oscillates up and down. However, with increasing immersion of the tube, the phase of the oscillation within the tube becomes different from that outside the tube. At a defined depth of about one half the tank diameter, the phase shift is approximately 180°, which phase shift remains constant with further increasing immersion depth of the tube. It has further been found that the amplitudes of the liquid oscillations within such a tube are a maximum at a tube immersion depth of ¼ to ½ the tank diameter. This effect can readily be used as a wave interference principle to damp sloshing by exciting counter oscillations within a liquid bulk, which counter oscillations consume the energy of the liquid motion by superposition.

Other objects and many attendant advantages will become apparent from the following detailed description when taken together with the accompanying drawings, in which:

FIGURE 1 is an elevational, sectional view of a container embodying the present invention.

FIGURES 2, 3 and 4 are sectional, elevational views of a portion of a container illustrative of the principle underlying the invention;

FIGURE 5 is an elevational sectional view of one embodiment of the anti-slosh device of the present invention;

FIGURE 6 is a partial plan view from above of the embodiment of the invention of FIGURE 5;

Figure 7:
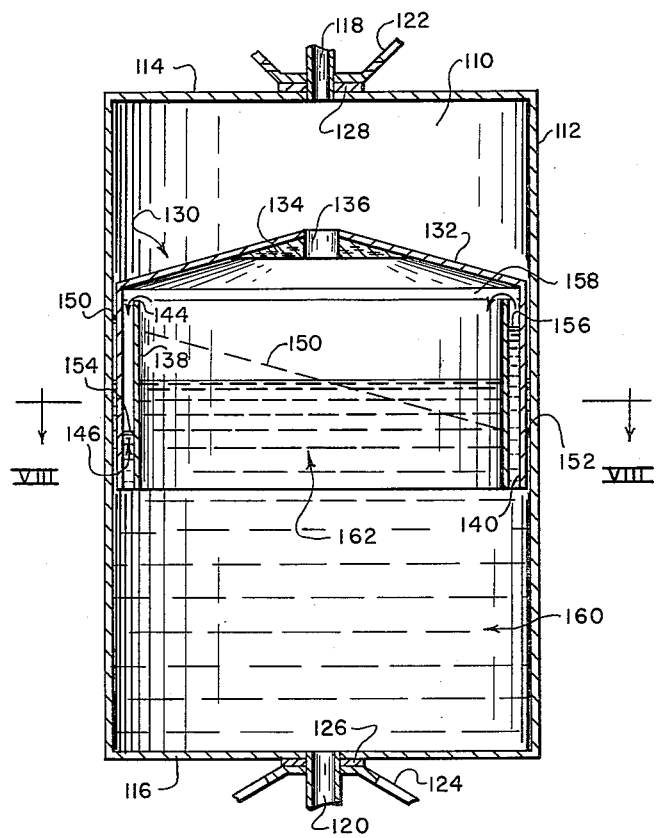
FIGURE 7 is a sectional elevational view of another embodiment of the invention.

Having reference first to FIGURE 1, there is shown a tank 10, representative of a large tank subject to liquid sloshing, having side walls 12, bottom wall 14, top wall 16, and means (not shown) for filling and emptying a liquid. Tank 10 has a diameter "D." It is partially filled with a liquid 18 having, when the liquid 18 is at rest, a top surface 20. When tank 10 is subjected to vibration liquid 18 is caused to oscillate in response thereto. During such oscillation, liquid 18 will have a surface at one maximum point in its oscillation as indicated by dashed line 22, having a high point 24 and a corresponding low point 26. Tube 30, having upper and lower open ends 32, 34 respectively, is immersed into liquid 18 near tank wall 12 and in the plane of motion of the oscillations. When tube 30 is immersed to a depth, delta ($\delta$), of one-half the tank diameter D, the liquid 18 oscillates within tube 30 with essentially the same magnitude, as shown by points 36, 38, as it does within tank 10 as indicated by points 24, 26. However, it will be noted that the oscillations within tube 30 are out of phase with those of tank 10 so that when oscillating liquid level 22 has reached points 24, 26, the level within the tube 30 is at point 38, thus the oscillations 36, 38 within tube 30 being opposed to oscillations 24, 26 within tank 10.

FIGURES 2, 3 and 4 are illustrative of the wave interference principle as an interference tube is progressively immersed in liquid 18. For the sake of simplicity, only a portion of tank 10 is shown, the reference numerals being the same in all situations as in FIGURE 1. Thus, in FIGURE 2, tube 30 has been inserted into tank 10 so that end 34 is at the level of non-oscillating liquid surface 20, the immersion depth delta thus being zero. As liquid 18 oscillates, the liquid level fluctuates so that point 24 will move up and down wall 12 and the level 36 within tube 30 will move correspondingly, and is seen to be essentially a continuation of level 22. However, as delta increases, the phase of liquid oscillation within tube 30 becomes different from that within tank 10. Thus, in FIGURE 3, tube 30 has been immersed in liquid 18 so that tube end 34 is below liquid level 20 a distance delta. Here, as level 22 has reached a maximum point 24 on tank wall 12, the corresponding level within tube 30 is seen to be at point 38, and is about 90° out of phase with the tank liquid oscillation, that is, the phase of oscillations within tube 30 has begun to shift from those within tank 10 as delta becomes greater. In FIGURE 4, tube 30 has been immersed within liquid 18 so that delta is equal to one-half the tank diameter, the point 38 within tube 30 now being substantially equal to point 24 in amplitude, but opposite in phase. There would be no substantial change in magnitude or phase of the oscillations within tube 30 on further immersion (i.e., increasing delta) from this point. Thus, it has been found that the amplitudes of the oscillations within interference tubes 30 are a maximum when delta is from ¼ to ½ the tank diameter, and the phase shift remains substantially constant once an immersion depth (delta) of one-half the container diameter has been reached. It will thus be readily seen that this effect can be used as a wave interference principle to damp slosh by exciting counter oscillations within a liquid bulk, which counter oscillations consume the energy of the liquid in motion by superposition.

Having reference now to FIGURES 5 and 6, wherein FIGURE 5 is a sectional elevational view of a portion of a liquid propellant system and FIGURE 6 is a partial sectional plan view taken on the line VI—VI of FIGURE 5, there is shown a conventional propellant tank 40 for use in a missile having a tank wall 42, upper bulkhead 44 and lower bulkhead 46, propellant inlet line 48 and propellant outlet 50, with structural fastening and reinforcing elements 52, 54 on the upper end and 56, 58 on the lower end, which fasten tank 40 and position it within the missile frame work 60. Positioned within propellant tank 40 and secured to the walls 42 thereof, by any conventional means, such as welded flanges 61, are a plurality (here shown as 6) of interference damping tubes of the present invention designated by the reference numeral 62. These tubes are preferably, although not necessarily, semi-cylindrical and are symmetrically attached to tank wall 42. They may extend the entire length of tank 40 or over merely a portion thereof as shown, depending on the requirements to be met.

As previously explained in relation to FIGURE 1, as liquid propellant 64 oscillates inside the tank, as at 66–68, it will be counteracted by an equal and opposite oscillation within the interference tube 62 as indicated at 70–72. It is readily seen that this balances the liquid mass dislocations due to sloshing and minimizes the forces exerted toward the tank walls 42 and consequently the support structures 52, 54, 56, 58 and the missile structure 60. In addition, it has been found that the oscillations within the tubes 62 may be further regulated by providing orifices or other flow restricting mechanisms (not shown) at the upper and/or lower openings of the tubes 62.

Figure 8:
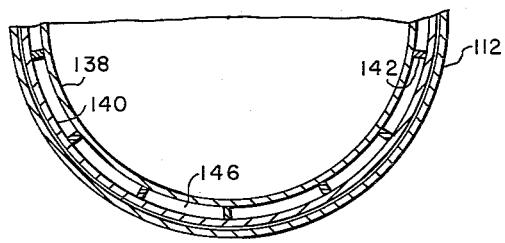
FIGURE 8 is a partial sectional plan view from above of the device of FIGURE 7.

FIGURE 7 is illustrative of a modification of the basic principle as embodied by the device of FIGURE 5, and is a sectional, elevational view of what may best be termed an "Interference Bell." Here, the propellant container is indicated by reference numeral 110, and has side walls 112, top and bottom bulkheads 114 and 116 respectively, and propellant inlet and outlet lines 118, 120 extended through the bulkheads. Structural positioning members 122, 124 may be attached to tank 110 at propellant lines 118, 120 by means of collars 126, 128 if desired. Into tank 110 is positioned a bell member 130 which comprises essentially a lid 132, buoyancy means 134, lid 132 having a gas exhaust outlet 136 and two inter-connected, concentrically arranged cylindrical walls designated by the reference numerals 138 and 140, respectively, these walls being inter-connected by cross walls 142 as best seen in FIGURE 8. Buoyancy means 134 is illustrated only schematically and thus the actual elevation of bell member 130 will depend upon the actual buoyancy means employed and its displacement of propellant 160. The inner concentric wall 138 is shortened at the upper end 144 so that tubes 146 are formed by walls 138, 140 and 142 and open toward the interior of bell 130 in much the same manner as the interference tubes of the embodiments previously disclosed. These "tubes" 146 are of course relatively flat as compared to the semi-cylindrical tubes previously described, however, their operation is essentially the same. It has been found that the length of the cylinders 138, 140 should be approximately 7/16 of the tank diameter, which length will produce the largest amplitude of oscillation within tubes 146. When the external level, indicated by reference numerals 150, 152, that is the propellant 160 within tank 110, begins oscillating, as previously explained, the level within the tubes 146 will also oscillate but with a phase shift of 180° as shown at 154, 156.

The shortening of the inner cylinder 138 provides an opening 158 at the top of tubes 146 into the interior 162 of the bell 130 or vice versa, which action will cause a corresponding tilt or inclination in the bell. At the same time the motion of the propellant 160 external to the bell tends to tilt the bell in a direction opposite to that caused by the overflow-inflow as represented by the arrows. Consequently, the position of the bell and the liquid level will be stabilized to a maximum.

The interference bell has the advantage of covering practically the total liquid surface which substantially eliminates pressure decay. Such pressure decay is of course a major concern in missiles and as herein obviated constitutes a major advantage in liquid propellant systems.

Figure 10:
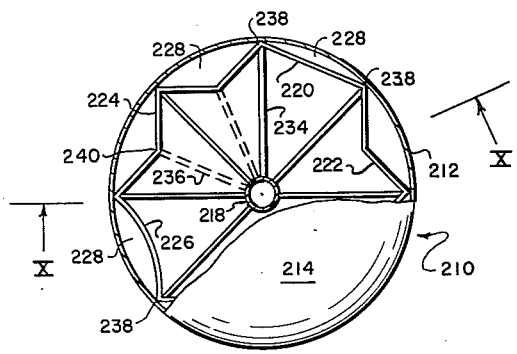
FIGURE 10 is a sectional plan view from above of the embodiment of FIGURE 9.
Figure 9:
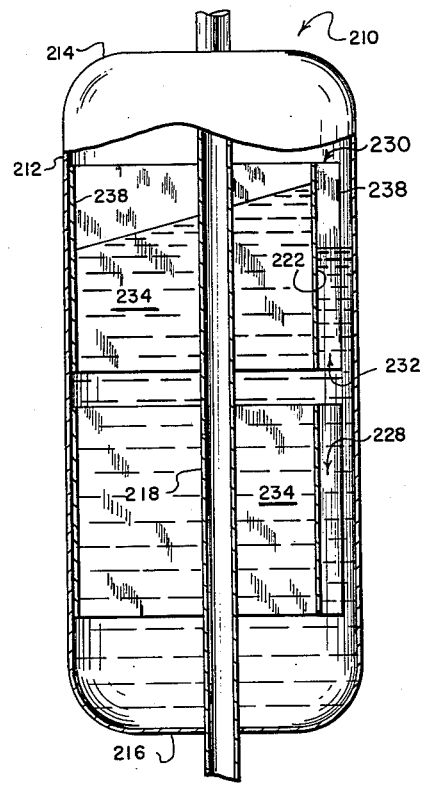
FIGURE 9 is a sectional elevational view of another embodiment of the invention.

FIGURES 9 and 10 are illustrative of another embodiment of the invention. In this instance, propellant container or tank 210 has a cylindrical side wall 212 and top and bottom walls 214, 216 respectively. As in the case of exceptionally large containers, to which this embodiment is particularly applicable, it may have a central reinforcing and fluid conveying conduit 218 therethrough. Fluid ingress and egress means (not shown) are provided as desired. Elongated sheet elements 220, (or 222/224/226, dependent on design) are positioned on the inside wall of tank 210 in a chordlike manner so that they define, with wall 212, a fluid receiving volume (or tube) 228 which acts in the same manner as the previously described "interference tubes."

Obviously, the particular shape the sheet elements 220 (or 222/224/226) take is a matter of choice. For purposes of illustration as shown in FIGURE 10, sheet element 220 is flat, 222 and 224 are V-shaped, and 226 is arcuate. Tubes 228 are open at top 230 and bottom 232. Structural elements 234 may be employed to reinforce the tank, and radiate from conduit 218 outwardly to elements 220 (222, 224, 226) to which they are secured, as at 238, the structure having an interior web-like construction. Elements 234 may be in sheet form, as shown in FIGURE 9, or may be rods or beams (not shown).

Reinforcing elements 234 are joined to "chord" members 220 (222, 226) at their intersection 238 with wall 212. The structure may obviously be widely varied, as illustrated by radial member 236 (in phantom line) which is joined to "chord" member 224 at its central portion 240. It is also apparent that a plurality of spaced "interference tubes" 228 may be employed, as shown in FIGURE 9, or that such tubes could be continuous (not shown) over the major length of the tank 210, or that tubes 228 could be offset in relation to each other laterally, such structural modifications in no way affecting the inventive concept disclosed.

It will thus be seen that the above described invention eliminates to a substantial extent the slosh problems encountered in liquid propelled missile systems, and is accomplished in a highly satisfactory, relatively simple, low weight and economically feasible manner. As previously noted, baffle devices of the prior art which were fixed to the tank wall acted as "break waters," and as a consequence thereof such devices acted only to increase the liquid level turbulence which is ascribed as a cause of decay of the ullage pressure needed for propellant utilization, while at the same time they transferred the forces resultant from sloshing to their support structures and consequently the missile structure itself. Thus, although such means were, for the most part, effective as slosh suppressors, they created or enhanced additional problem areas.

In contrast to the "break water" baffle devices which consumed forces due to slosh motion by producing surface turbulence and thereby causing pressure decay, the above disclosed interference tube and interference bell act on their own to excite counter oscillations within the liquid bulk, which counter oscillations interfere with the forced tank oscillations and thus consequently reduce the forces resultant from the liquid motion to a minimum without affecting the missile structure. The bell disclosed will not bounce toward the tank wall due to the hydro-dynamic action discussed in reference to FIGURES 7 and 8. It is, of course, obvious that the bell will cause only a minor transportation problem resultant from its single degree of freedom in mobility as opposed to the "floating can" device of the prior art. As noted, the bell compared to the fixed tube has the advantage of covering the total liquid surface and thereby better eliminating pressure decay.

From the above, it will be seen that a completely practical slosh suppressing method and the means by which such method may be practiced has been devised, and one which is particularly suited to incorporation into the larger missiles resultant from present technology.

What is claimed is:

1. A method of damping oscillatory motions induced in a contained liquid propellant comprising:
   (A) positioning therein at least one substantially open tube;
   (B) immersing said tube in the liquid in the plane of oscillation of the liquid;
   (C) causing the liquid to oscillate within the immersed tube so that such oscillation is of substantially the same amplitude but different in phase from that without the tube.

2. The method as defined in claim 1 wherein oscillations within the tube are resultant from immersing said tube within the liquid to a depth of one-quarter the container diameter.

3. The method as defined in claim 1 wherein oscillations within the tube are resultant from immersing said tube within the liquid to a depth of one-half the container diameter.

4. The method as defined by claim 1 wherein said tube immersion is of the order of one-quarter to one-half the container diameter.

5. The method of nullifying liquid resonance oscillations in propellant containers in liquid propelled launch vehicles which comprises the steps of:
   (A) providing a plurality of tubes in proximity to the container walls;
   (B) causing said tubes to be immersed within the liquid in such manner as to excite liquid oscillations within said tubes of a phase different than that of the container so as to nullify forces resultant from the oscillations.

6. The method as defined in claim 5 wherein said tubes are moveable responsive to the liquid level.

7. The method as defined in claim 5 wherein the step incorporating immersion of said tubes is completed at an immersion depth of one-quarter to one-half the container diameter.

8. A method of obviating forces resultant from liquid oscillations in a launch vehicle having at least one liquid propellant container comprising:
   (A) inducing counter oscillations within the liquid bulk,
   (B) causing said induced counter oscillations to act as a wave interference force to consume liquid motion energy by superposition.

9. The method as defined in claim 8 wherein said counter oscillations are induced by immersing within the liquid bulk and adjacent the peripheral limits thereof an interference tube.

10. The method of claim 9 wherein said interference tube is immersed in the liquid bulk a distance delta, where delta is greater than zero and less than the tank diameter.

11. The method of damping oscillation induced forces within a partially confined liquid comprising:
   (A) inducing a portion of said liquid to assume an oscillatory motion different from the motion whose forces it is desired to damp, and
   (B) causing said last named oscillations to act in opposition to said first named oscillations, thus consuming the forces resultant from said first named oscillations by superposition.

12. In a container closed on at least three sides for the reception of a liquid, the improvement which comprises:
   (A) slosh suppressing means operative to cause an oscillating liquid contained in said container to nullify the forces engendered by such oscillation, said means comprising;
      (1) at least one open tube adjacent one side of said container;
      (2) said tube positioned within said container,
      (3) said tube immersed in the liquid in the plane of motion of the liquid oscillations, and
      (4) said immersion being to a depth of at least one-quarter the container diameter.

13. The slosh suppressing means as defined in claim 12 wherein said immersion depth is at least one-half the container diameter.

14. The slosh suppressing means defined by claim 12 wherein there are a plurality of said tubes symmetrically positioned within said container.

15. The improvement as defined by claim 12 wherein said tube is moveable relative to said container side in response to the liquid level within said container.

16. The improvement as defined by claim 12 including: means responsive to the liquid level within said container, said means insuring a substantially constant tube immersion depth of substantially one-half the container diameter.

17. The improvement as defined by claim 14 including: liquid level responsive means, said last named means serving to limit the immersion depth of said tubes to no more than one-half the container diameter.

18. The improvement as defined by claim 14 wherein said tubes are fixed to said container walls.

19. A tank for use in a launch vehicle comprising:
 (A) wall means defining a liquid container,
    (1) said wall means having means cooperative therewith serving to damp oscillations within said liquid by exciting counter oscillations therein, said counter oscillations consuming the energy of the liquid motion by superposition,
        (a) said cooperative means comprising a plurality of elongated volume defining elements,
        (b) the longitudinal axis of said elongated elements being parallel to the longitudinal axis of said tank,
    (2) said oscillation damping means being operative on immersion to a defined depth in the contained liquid.

20. A tank as defined in claim 19 wherein said cooperative means comprises:
 (A) semicylindrical sheet elements fixed to said wall means at their longitudinal edges and defining open ended tube-like members,
 (B) said tube-like members arranged symmetrically within said tank and having a length substantially the same as the diameter of the tank.

21. A tank as defined by claim 19 wherein said cooperative means comprises:
 (A) a bell-like member open on the bottom thereof;
    (1) buoyancy means operatively associated with the closed end of said bell,
    (2) first wall means pendent from the closed end of said bell and substantially parallel to said tank wall defining means,
    (3) second wall means spaced inwardly from said first wall means by longitudinally extending cross walls, said first and second wall means and cross walls forming a plurality of tubes open at the bottom of said bell,
    (4) said second wall means of shorter length than said first wall means whereby said tubes open to the interior of the bell and provide ingress and egress means for the liquid contained within said bell, and serve to cause a bell inclination which is stabilized by an opposite tilt resultant from liquid motion external to the bell.

22. A container for use as a liquid propellant tank on a launch vehicle comprising:
 (A) an elongated wall defining a hollow cylinder, said cylinder closed at both ends,
 (B) support and positioning means for positioning said tank within a launch vehicle,
 (C) propellant inlet and outlet means in communication with the interior of said tank,
 (D) means utilizing a wave interference principle to damp liquid propellant sloshing, said means comprising:
    (1) a plurality of discontinuous cylinder reinforcing structural members extending from a central portion of said cylinder radially outwardly and serving to reinforce said elongated wall, some of said members being spacedly, vertically positioned one above the other,
    (2) chord-like, elongated sheet elements structurally incorporated with said cylinder defining wall, said elements serving to form open ended volume defining sections at the inner periphery of said tank, said open ended volume defining sheet elements operative to cause a portion of an oscillating liquid propellant contained within said tank to undergo a shift in phase and thus nullify oscillation resultant forces and damp oscillation by superposition,
    (3) said structural members secured to said chord-like sheet elements and serving to form a reinforcing, structurally integrated network for the tank interior.

References Cited in the file of this patent

UNITED STATES PATENTS

| | | |
|---|---|---|
| 1,007,348 | Frahm | Oct. 31, 1911 |
| 2,920,648 | Sheffer | Jan. 12, 1960 |

FOREIGN PATENTS

| | | |
|---|---|---|
| 1,039,992 | France | May 20, 1953 |